3,565,862
HYDROXYBENZENESULFONYL HALIDE
POLYMERIZATION
Robert W. Campbell and Harold Wayne Hill, Jr., Bartlesville, Okla., assignors to Phillips Petroleum Company, a corporation of Delaware
No Drawing. Filed Mar. 11, 1969, Ser. No. 806,279
Int. Cl. C08g 23/16
U.S. Cl. 260—49               9 Claims

ABSTRACT OF THE DISCLOSURE

High molecular weight poly(phenylenesulfonate) homopolymers and copolymers are produced by the condensation of hydroxybenzenesulfonyl halides in the presence of either a tertiary amine or an alkaline earth metal hydroxide catalyst in the presence of hexahydrocarbylphosphoramide reaction diluents. The polymers have utility as fibers, films, and for other molded articles.

BACKGROUND OF THE INVENTION

This invention relates to novel polymers and to a process of producing these and other polymeric materials. In accordance with a further aspect, this invention relates to novel copolymers of hydroxybenzenesulfonyl halides and the preparation thereof. In accordance with a further aspect, this invention relates to an improved method of preparing high molecular weight poly(phenylenesulfonate) homopolymers and copolymers in the presence of a hexahydrocarbylphosphoramide reaction diluent. In accordance with a further aspect, this invention relates to an improved process for the production of high molecular weight poly(phenylenesulfonate) homopolymers and copolymers in the presence of a polymer solvent and a hexahydrocarbylphosphoramide reaction diluent.

Nearly all known poly(phenylenesulfonate) polymers are derived from bis-phenols and disulfonyl halides. Such polymers suffer numerous disadvantages, that is, they are reported to be brittle even at high molecular weights, and the materials are otherwise unsuitable for most uses.

More recently, Hall, U.S. 3,337,512, disclosed that poly(2,6-xylylsulfonates) having regular repeating units can be synthesized. However, the polymers produced by the process of that invention are lacking in many desirable properties and are relatively low in molecular weight.

More recently, in a copending application, Campbell (Case 18588) disclosed a process whereby a poly(phenylenesulfonate) polymer could be prepared employing 4-hydroxybenzenesulfonyl halides. The application also disclosed a process for the production of hydrocarbyl, halo, or alkoxy derivatives of poly(phenylenesulfonates).

In accordance with the present invention, high molecular products are produced by the self-condensation of an aromatic compound which contains both a hydroxyl group and a sulfonyl group as the only substituents on the same phenyl ring in the presence of an improved and novel reaction diluent.

Accordingly, an object of this invention is to provide a novel process for the preparation of these high molecular weight polymers.

Other objects and aspects, as well as the several advantages of the invention, will be apparent to those skilled in the art upon reading the specification and the appended claims.

SUMMARY OF THE INVENTION

In accordance with the invention, a hexahydrocarbylphosphoramide is employed as a reaction diluent in combination with a tertiary amine or an alkaline earth metal hydroxide catalyst to effect synthesis of a high molecular weight poly(phenylenesulfonate) from hydroxybenzenesulfonyl halides.

Further in accordance with the invention, poly(phenylenesulfonates) are produced having the formula of repeating units

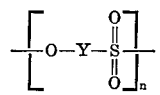

wherein Y is one of:

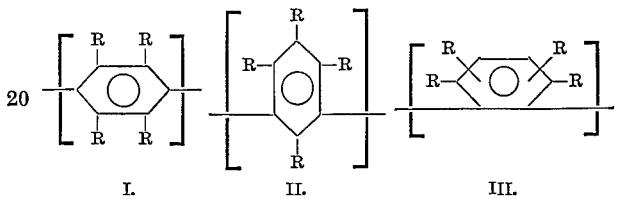

I.          II.          III.

Further, according to the invention, high molecular weight poly(phenylenesulfonates) are formed by homo-reacting or co-reacting the hydroxybenzenesulfonyl halides in the presence of either a tertiary amine or an alkaline earth metal hydroxide catalyst in a hexahydrocarbylphosphoramide reaction diluent.

Further, according to the invention, the homo-reaction or co-reaction of hydroxybenzenesulfonyl halides is carried out in the presence of a solvent selected from cyclic ketones and polar carboxylic acid amides having no hydrogen atoms bonded to the nitrogen atoms, containing a hydrogen halide acceptor.

According to the process of this invention, the hydroxybenzenesulfonyl halide and hexahydrocarbylphosphoramide are mixed prior to contacting with either a tertiary amine or an alkaline earth metal hydroxide catalyst to form high molecular weight poly(phenylenesulfonates).

DESCRIPTION OF PREFERRED EMBODIMENTS

The conversion of this invention can be represented as follows:

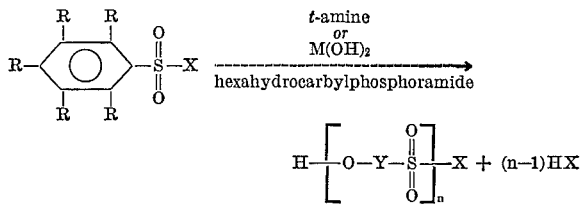

wherein Y is one of I, II, and III.

In the above conversion, one and only one R of each molecule of hydroxybenzenensulfonyl halide is —OH; wherein all other R's are H, alkyl, cycloalkyl, aryl, or combinations thereof such as aralkyl, alkaryl, or the like, having in the range of 1 to 12 carbon atoms per R group, halogens such as fluorine, chlorine, bromine, iodine, or alkoxy having in the range of 1 to 6 carbon atoms per alkoxy radical; wherein M is an alkaline earth metal such as beryllium, magnesium, calcium, strontium, barium; and wherein X is a halogen such as chlorine, bromine, or iodine, and $n$ is an integer in the range of from about 4 to about 10,000 or greater.

Examples of suitable hydroxybenzenesulfonyl halides that can be applied according to the invention include:

4-hydroxybenzenesulfonyl chloride
2,6-dimethyl-4-hydroxybenzenesulfonyl chloride
2-hydroxybenzenesulfonyl bromide
3-hydroxybenzenesulfonyl chloride
2,6-dichloro-4-hydroxybenzenesulfonyl iodide
3,5-dibromo-4-hydroxybenzenesulfonyl bromide
4-hydroxy-2,3,5,6-tetrafluorobenzenesulfonyl chloride
2,6-dihexyloxy-4-hydroxybenzenesulfonyl bromide
3,5-dimethyloxy-4-hydroxybenzenesulfonyl chloride
2-benzyl-5-hydroxybenzenesulfonyl chloride
3-hydroxy-5-phenylbenzenesulfonyl chloride
4-hydroxy-2,3,5,6-tetramethylbenzenesulfonyl bromide
2-dodecyl-6-hydroxybenzenesulfonyl chloride
2-cyclododecyl-6-hydroxybenzenesulfonyl chloride
3-hydroxy-5-(2-methylcyclohexyl)benzenesulfonyl chloride
3-(3-cyclohexylpropyl)-5-hydroxybenzenesulfonyl chloride
4-hydroxy-2-(4-tolyl)benzenesulfonyl chloride
2-hydroxy-3,4,5,6-tetraethylbenzenesulfonyl iodide
4-hydroxy-2,3,5,6-tetramethyloxybenzenesulfonyl bromide and the like.

Examples of suitable tertiary amines include triethylamine, trimethylamine, tetramethylethylenediamine, N-methylpiperidine, ethyldiisopropylamine, triethylenediamine, 2,4,6-collidine, (dimethylamino)methylbenzene, and N,N'dimethylpiperazine, hexamethylenetetraamine and the like. In effect, any tertiary amine that is a compound wherein the three valences of the nitrogen are bonded to carbon atoms, that does not contain labile hydrogen groups and that does not deleteriously react under the reaction environment can be employed.

Examples of suitable alkaline earth metal hydroxides include beryllium hydroxide, magnesium hydroxide, calcium hydroxide, strontium hydroxide and barium hydroxide.

The hexahydrocarbylphosphoramide reaction diluents that can be employed according to the present invention have the formula

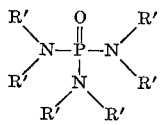

wherein R' is alkyl, cycloakyl, aryl, or combinations thereof, such as alkaryl, aralkyl, or the like, having in the range of 1 to 8 carbon atoms per R' group.

Examples of suitable hexahydrocarbylphosphoramides that can be employed according to the invention include:

hexamethylphosphoramide
hexaoctylphosphoramide
hexacyclopentylphosphoramide
hexacyclooctylphosphoramide
hexaphenylphosporamide
hexabenzylphosporamide
hexa(p-tolyl)phosphoramide
hexa(3-ethylcyclohexyl)phosphoramide
hexa(2-cyclohexylethyl)phosphoramide
N,N'N''-trimethyltriphenylphosphoramide
N,N'-dibenzyltetrapropylphosphoramide
N,N,N'-tricyclohexyltrimethylphosphoramide and the like.

The polar carboxylic acid amides useful as solvents in the instant invention comprise N-methylpyrrolidone, dimethylacetamide, and dimethylformamide. The cyclic ketones useful in the process of the invention include cyclohexanone, cyclododecanone, and the like, and mixtures thereof.

The instant invention constitutes a significant advance in the art over prior art processes in that high molecular weight polymers, both homopolymers and copolymers, having improved properties are hereby produced.

According to the process of this invention, temperatures in the range of from the melting point of the reaction medium to about 50° C. can be employed. The hydroxybenzenesulfonyl halide employed can comprise in the range of about 10 to 30 weight percent of the reaction medium which is in the liquid phase and which is comprised of the hydroxybenzenesulfonyl halide, the hexahydrocarbylphosphoramide, and optionally a good polymer solvent such as N-methylpyrrolidone, dimethylacetamide, dimethylformamide, cyclic ketones such as cyclohexanone, cyclododecanone, the like, or mixtures thereof. The hexahydrocarbylphosphoramide can comprise in the range of 5 to 90 weight percent of the above liquid medium. Other solvents or mixtures thereof can be employed to make up the part of the above medium which is not comprised of hydroxybenzenesulfonyl halide or hexahydrocarbylphosphoramide, the only criticality being that such solvents must be known to be useful for the dissolving of polymers, such solvents must be substantially polar, and such solvents must not substantially react with the reactants employed, with the hexahydrocarbylphosphoramide, or deleteriously affect the reaction.

The above solution is admixed with a tertiary amine or an alkaline earth hydroxide base at the temperatures above specified to effect condensation. Sufficient base should be employed to effect complete removal of hydrogen halide, generally in the range of 100 to 200 mole percent of the hydroxybenzenesulfonyl chloride employed.

Sufficient time to effect the degree of conversion desired should be employed, generally reaction times in the range of about 1 minute to about 3 hours are employed. Pressures sufficient to maintain the reactants substantially completely in the liquid phase should be employed. Generally, pressures in the range of about 0.5 to 10 atmospheres are suitable.

If desired, the conversion can be run continuously as well as batchwise. Polymer can be recovered by any conventional means such as filtration, centrifuging, solvent stripping, and the like. Produced polymer can then be handled in any conventional manner. Conventional reaction techniques and conventional equipment can be employed.

The homopolymers and copolymers of this invention have a wide variety of uses. For example, as coating compositions, they can be coated onto metallic or non-metallic substrates by flame spraying, melt casting or by casting while dissolved in one of the solvents in which it is made or other solvent in which it is soluble and thereafter evaporating the solvent at an elevated temperature and, if desired, at reduced pressure. The hot solution of the solvent may be forced through a spinneret into a heated drying tower, preferably maintained at a reduced pressure, to form filaments or fibers, or the molten polymer can be forced through spinnerets by well-known techniques to form filaments and fibers. A fiber so formed can be formed into yarns or used to form fiber matting.

Alternatively, the polymers can be cast from solution or from the melt of the polymer, extruded through a die or otherwise sheeted to form a continuous film of the polymers. These compositions can also be injected to form intricately shaped objects of wide utility, depending on the particular object molded.

Other uses for these films and fabrics or mats made from the fibers include a wide variety of electrical applications, that is, as a dielectric, for example, as a dielectric in capacitors, as slot insulation for motors, primary insulation for heat resistant wire, pressure-sensitive electrical tape, split mica insulating tape, i.e., mica sheet laminated or bonded with the polymer, small condensers, metal foil laminated to the film or film having an adherent metal coatings, weather-resistant electrical wire, i.e., a conductor wrapped with film coated with asphalt, as a wrapping for submerged pipes to insulate against ground current as primary and secondary insulation in transformer construction, as a dielectric in electro-luminescent structures, etc.

Other valuable uses for the polymers, both homopolymers and copolymers, of this invention will be readily apparent to those skilled in the art. Also, many apparently widely different embodiments such as the adding of pigments, fillers, stabilizers, plasticizers, etc. may be made to modify the properties of the polymers without departing from the spirit and scope of the invention.

Example I

A stirred reactor maintained under nitrogen was charged with 1.93 g. (10 mmoles )of 4-hydroxybenzenesulfonyl chloride, 10 ml. of hexamethylphosphoramide. After cooling the resultant solution to 0° C., 1.26 g. (12.5 mmoles) of triethylamine was added. The reaction was effected for 6 minutes at 0° C.; then 200 ml. of water was added. Polymer was recovered which was washed with water, methanol, water, methanol, and repeatedly with hot (50° C.) acetone. A total of 1.29 g. of polymer having an inherent viscosity in hexamethylphosphoramide at 30° C. of 0.97 (inherent viscosity is proportional to molecular weight) was recovered after drying in vacuo at 70° C. This constituted a yield of 82 mole percent based on the 4-hydroxybenzenesulfonyl chloride charged.

This example demonstrates the synthesis of a high molecular weight poly(arylenesulfonate) according to the process of this invention. The good yield of high molecular weight polymer which was not soluble in hot acetone is particularly noteworthy. It is also noteworthy that the reaction can be run at more convenient higher temperatures, and that reaction time is minimized.

Example II

A stirred reactor maintained under nitrogen was charged with 1.93 g. (10 mmoles) of 4-hydroxybenzenesulfonyl chloride, and 10 ml. of hexamethylphosphoramide. After cooling the reactor contents to 5° C., 1.52 g. of triethylamine was added. The reaction was effected for 3.5 minutes at 5° C. Then 200 ml. of $H_2O$ was added. A polymer was recovered which was washed with water, methanol, water, methanol, and repeatedly with hot (50° C.) acetone. A total of 1.1 g. of polymer having an inherent viscosity in hexamethylphosphoramide at 30° C. of 0.89 was recovered after drying in vacuo at 70° C. This constituted a yield of 70 mole percent based on the 4-hydroxybenzenesulfonyl chloride charged.

A sample of the poly(phenylenesulfonate) prepared above was melted and fibers were pulled from the melt. Such fibers were then hand drawn. The fibers were strong and clear.

This example further demonstrates the preparation of a high molecular weight poly(arylenesulfonate) according to the process of this invention. Particularly noteworthy is the high molecular weight polymer formed in the short reaction time. In combination with Example I, this example demonstrates that lowered amounts of the tertiary amine can be employed using a hexahydrocarbylphosphoramide solvent of this invention. Previous work with mixed amide solvents showed no improvement using triethylamine at the lower level of Example I.

Example III

The run of Example II was repeated except that a temperature of 25° C. rather than a reaction temperature of 5° C. was employed. A total of 1.13 g. of polymer was recovered having an inherent viscosity in hexamethylphosphoramide at 30° C. of 0.72. This constituted a yield of 72 mole percent based on the 4-hydroxybenzenesulfonyl chloride charged. An attempt was made to determine inherent viscosity in LiCl-N-methylpyrrolidone at 30° C. (4 weight percent of the mixture comprised of LiCl) which was the method employed to determine the inherent viscosity of poly(phenylenesulfonates) of lower molecular weight which were synthesized previously. Inherent viscosity could not be determined in this manner because the polymer would not all go into solution.

This example demonstrates that high molecular weight poly(arylenesulfonates) can be synthesized according to the process of this invention at convenient room temperatures and at very short reaction times.

A sample of the polymer prepared according to this example was melted, and fibers were pulled from the melt. Such fibers were then hand drawn. The fibers were strong and clear.

Another sample of the poly(phenylenesulfonate) prepared according to this example was molded at 290° C. at 10,000 p.s.i.g. pressure for 30 seconds and quenched in cold water. The film was tough and clear.

Example IV

A stirred reactor maintained under nitrogen was charged with 1.93 g. of parahydroxybenzenesulfonyl chloride, 5 ml. of N-methylpyrrolidone, 3 ml. of dimethylacetamide, and 2 ml. of hexamethylphosphoramide. After bringing the reactor contents to —45° C., 1.52 g. of triethylamine was added. The reaction was effected for 10 minutes at —45° C.; 200 ml. of $H_2O$ was then added at about 25° C. A polymer was recovered which was washed with water, methanol, water, methanol, and repeatedly with hot (50° C.) acetone. A total of 1.3 g. of polymer having an inherent viscosity in hexamethylphosphoramide at 30° C. of 0.84 was recovered after drying in vacuo at 70° C. which constituted a yield of 83 mole percent based on the 4-hydroxybenzenesulfonyl chloride charged.

Example V

A stirred reactor maintained under nitrogen was charged with 1.93 g. of 4-hydroxybenzenesulfonyl chloride, 8 ml. of hexamethylphosphoramide, and 2 ml. of N-methylpyrrolidone. After bringing the reactor contents to —20° C., 1.52 g. of triethylamine was added. The reaction was effected for 5 minutes at —25° C.; and 200 ml. of $H_2O$ was then added at about 25° C. A polymer was recovered which was washed with water, methanol, water, methanol, and repeatedly with hot (50° C.) acetone. A total of 1.28 g. of polymer having an inherent viscosity in hexamethylphosphoramide at 30° C. of 0.87 was recovered after drying in vacuo at 70° C. which constituted a yield of 82 mole percent based on the 4-hydroxybenzenesulfonyl chloride charged.

This example and Example IV demonstrate that hexahydrocarbylphosphoramides can be used in combination with prior art diluents to produce high molecular weight poly(phenylenesulfonates) according to the process of this invention.

Example VI

A control run was made wherein a stirred reactor maintained under nitrogen was charged with 1.93 g. of 4-hydroxybenzenesulfonyl chloride, 6 ml. of N-methylpyrrolidone, and 4 ml. of dimethylacetamide. After bringing the reactor contents to —38° C., 1.52 g. of triethylamine was added. The reaction was effected for 10 minutes at —38° C.; then 200 ml. of water was then added at about 25° C. A polymer was recovered which was washed with water, methanol, water, methanol, and repeatedly with hot (50° C.) acetone. A total of 1.19 g. of polymer having an inherent viscosity in LiCl-N-methylpyrrolidone at 30° C. (4 weight percent mixture comprised of LiCl) of 0.56 and an inherent viscosity in hexamethylphosphoramide at 30° C. of 0.63 was recovered after drying in vacuo at 70° C. which constituted a yield of 76 mole percent based on the 4-hydroxybenzenesulfonyl chloride charged.

This example demonstrates the synthesis of a lower molecular weight poly(phenylenesulfonate) according to prior art process. It should be noted that low temperatures are required and longer reaction times are also required. However, polymers having molecular weights comparable with those of the instant invention are not produced.

Example VII

A stirred reactor maintained under nitrogen was charged with 2.21 g. of 2,6-dimethyl-4-hydroxybenzenesulfonyl chloride and 10 ml. of hexamethylphosphoramide. After bringing the reactor contents to 0° C., 1.52 g. of triethylamine was added. The reaction was effected for 6 minutes at 0° C.; then 200 ml. of water was added. A polymer was recovered which was washed with water, methanol, water, methanol, and repeatedly with hot (50° C.) acetone. A total of 0.79 g. of polymer having an inherent viscosity in hexamethylphosphoramide at 30° C. of 0.79 was recovered after drying in vacuo at 70° C. which constituted a yield of 43 mole percent based on the 2,6-dimethyl-4-hydroxybenzenesulfonyl chloride charged.

Example VIII

A control run under conditions similar to those of U.S. 3,337,512 was effected wherein a stirred reactor maintained under nitrogen was charged with a mixture comprised of 4.6 g. of 2,6-dimethyl-4-hydroxybenzenesulfonyl chloride and 10 ml. of nitrobenzene and was subsequently charged with 3.3 g. of triethylamine in 10 ml. of nitrobenzene over a period of about 15 minutes at room temperature. The mixture was stirred for about 15 hours at room temperature. Then 200 ml. of diethyl ether was added to the reactor and stirred for 0 minutes. The reactor contents were filtered, washed with water, ether, methanol, and hot (50° C.) acetone. The solids were dried in vacuo at 70° C. for about 16 hours to yield 1.6 g. of a polymer having an inherent viscosity in hexamethylphosphoramide of about 0.52, which constituted a yield of 42 mole percent based on the 2,6-dimethyl-4-hydroxybenzenesulfonyl chloride charged.

This example and Example VII demonstrate the improvement in the synthesis of hydrocarbyl-substituted poly(phenylenesulfonates) according to the process of this invention as compared with prior art processes. Note particularly the shortened reaction time and the fact that much higher molecular weight polymers are produced according to the process of the instant invention.

Example IX

A stirred reactor maintained under nitrogen was charged with 1.44 g. of parahydroxybenzenesulfonyl chloride, 0.55 g. (2.5 mmoles) of 2,6-dimethyl-4-hydroxybenzenesulfonyl chloride and 10 ml. of hexamethylphosphoramide. The reactor was brought to 0° C., and 1.52 g. (15 mmoles) of triethylamine was quickly added. The reaction was effected at 0° C. for 10 minutes. Then 200 ml. of water was added. The precipitate was filtered and washed with water, methanol, water, methanol, and hot acetone. Upon drying in vacuo at 70° C., 0.8 g. of polymer with an inherent viscosity of 0.86 in hexamethylphosphoramide at 30° C. was recovered. Fibers were drawn and film was pressed. A yield of 49 mole percent based on the hydroxybenzenesulfonyl chlorides charged was recovered. The film and fibers were tough and clear.

This example demonstrates the synthesis of a copolymer according to the process of this invention.

Example X

A stirred reactor maintained under nitrogen was charged with 1.44 g. of parahydroxybenzenesulfonyl chloride (7.5 mmoles), 0.55 g. of 2,6-dimethyl-4-hydroxybenzenesulfonyl chloride (2.5 mmoles), and 10 ml. of hexamethylphosphoramide. After bringing the reactor contents to 0° C., 1.52 g. of triethylamine was added. The reaction was effected for 6 minutes at 0° C. Then 200 ml. of water was added. A polymer was recovered which was washed with water, methanol, water, and methanol. A total of 1.41 g. of polymer having an inherent viscosity in hexamethylphosphoramide at 30° C. of 0.76 was recovered after drying in vacuo, which constituted a yield of 87 mole percent based on the 4-hydroxybenzenesulfonyl chloride and 2,6-dimethyl-4-hydroxybenzenesulfonyl chloride charged.

An amorphous film was molded of the sample of the polymer 270° C., for 30 seconds at 15,000 p.s.i. The film was tough and clear.

This example further demonstrates the preparation of a copolymer according to the process of this invention.

Example XI

A stirred reactor maintained under nitrogen was charged with 1.44 g. (7.5 mmoles) of 4-hydroxybenzenesulfonyl chloride, 0.55 g. (2.5 mmoles) of 2,6-dimethyl-4-hydroxybenzenesulfonyl chloride, and 6 ml. of N-methylpyrrolidone. After bringing the reactor contents to −38° C., 1.52 g. (0.5 mmoles) of triethylamine was added. The reaction was effected for 10 minutes at −38° C. Then 200 ml. of water was added. A polymer was recovered which was washed with water, methanol, methanol, water, methanol, and boiling acetone. The polymer remaining was dried in vacuo at 70° C. A total of 0.7 g. of polymer having an inherent viscosity in LiCl-N-methylpyrrolidone at 30° C. (4 weight percent of mixture comprised of LiCl) of 0.39 was recovered. This constituted a yield of 43 mole percent based on the 4-hydroxybenzenesulfonyl chloride and 2,6-methyl-4-hydroxybenzenesulfonyl chloride charged.

This example is exemplary of previous attempts to synthesize copolymers having higher molecular weights in amide solvents.

We claim:

1. A process for the production of poly(phenylenesulfonate) homopolymers and copolymers from (a) at least one hydroxybenzenesulfonyl halide of the formula

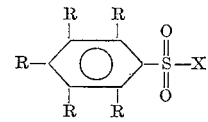

wherein one and only one R of each molecule of hydroxybenzenesulfonyl halide is —OH, the remainder of R's are selected from the group consisting of hydrogen, alkyl, cycloalkyl, aryl, aralkyl; alkaryl, alkcycloalkyl, and cycloalkalkyl, having in the range of 1 to 12 carbon atoms per R group, halogens selected from fluorine, chlorine, bromine, iodine, and alkoxy groups having in the range of 1 to 6 carbon atoms, and wherein X is selected from the group of halogens consisting of chlorine, bromine and iodine by contacting said hydroxybenzenesulfonyl halide, under conditions sufficient to cause its condensation, with (b) at least one basic compound selected from the group consisting of tertiary amines having no labile hydrogens and alkaline earth metal hydroxides wherein said basic compounds are present in an amount sufficient to remove the hydrohalogen acid present during condensation of said hydroxybenzenesulfonyl halide, in a reaction medium containing (c) a hexahydrocarbylphosphoramide of the formula

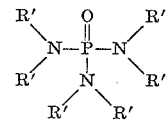

wherein R' is selected from the group consisting of alkyl, cycloalkyl, aryl, alkaryl, and aralkyl having in the range of 1 to 8 carbon atoms per R' group.

2. A process according to claim 1 wherein the contacting is effected at a temperature between the melting point of the reaction medium up to and including 50° C. and wherein the amount of (a) employed comprises 10–30 weight percent of the reaction medium.

3. A process according to claim 1 further comprising as a poly(arylenesulfonate) solvent at least one compound selected from cyclic ketones and polar carboxylic acid amides having no hydrogen atoms bonded to nitrogen.

4. A process according to claim 1 wherein (c) comprises 5–90 weight percent of the reaction medium.

5. A process according to claim 1 wherein (a) is mixed with (c) prior to contacting with (b).

6. A process according to claim 3 wherein (a) and (c) are mixed with the polymer solvent prior to contacting with (b).

7. A process according to claim 5 wherein at least two different hydroxybenzenesulfonyl halide compounds defined in (a) are mixed with (c) prior to contacting with (b) to form a copolymer.

8. A process according to claim 5 wherein (a) consists of at least one monomer selected from the group consisting of 4-hydroxybenzenesulfonyl chloride and 2,6-dimethyl-4-hydroxybenzenesulfonyl chloride, (b) is triethylamine and (c) is hexamethylphosphoramide.

9. A process according to claim 8 wherein a polymer solvent selected from N-methylpyrrolidone and dimethylacetamide is included in the reaction mass.

References Cited

UNITED STATES PATENTS

| | | | |
|---|---|---|---|
| 3,337,512 | 8/1967 | Hall | 260—79.3 |
| 3,401,148 | 9/1968 | Schlott et al. | 260—49 |

WILLIAM H. SHORT, Primary Examiner

L. L. LEE, Assistant Examiner

U.S. Cl. X.R.

117—122, 132, 161; 260—30.2, 32.4, 32.6, 32.8